No. 815,010. PATENTED MAR. 13, 1906.
G. W. GREENWOOD.
CLUTCH.
APPLICATION FILED MAY 27, 1903.
4 SHEETS—SHEET 1.
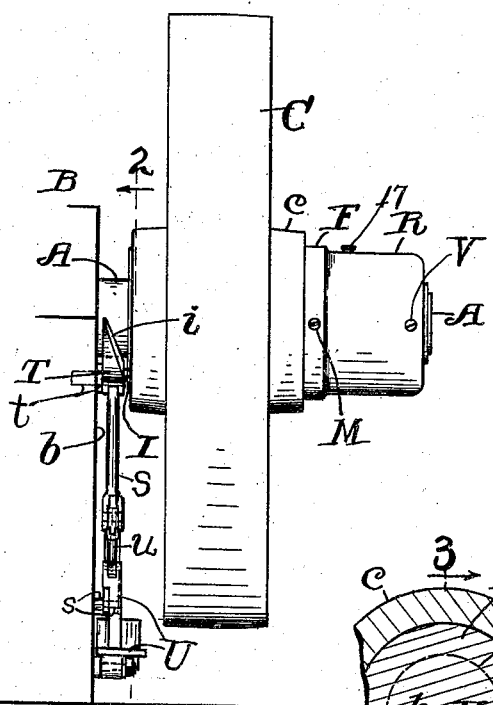
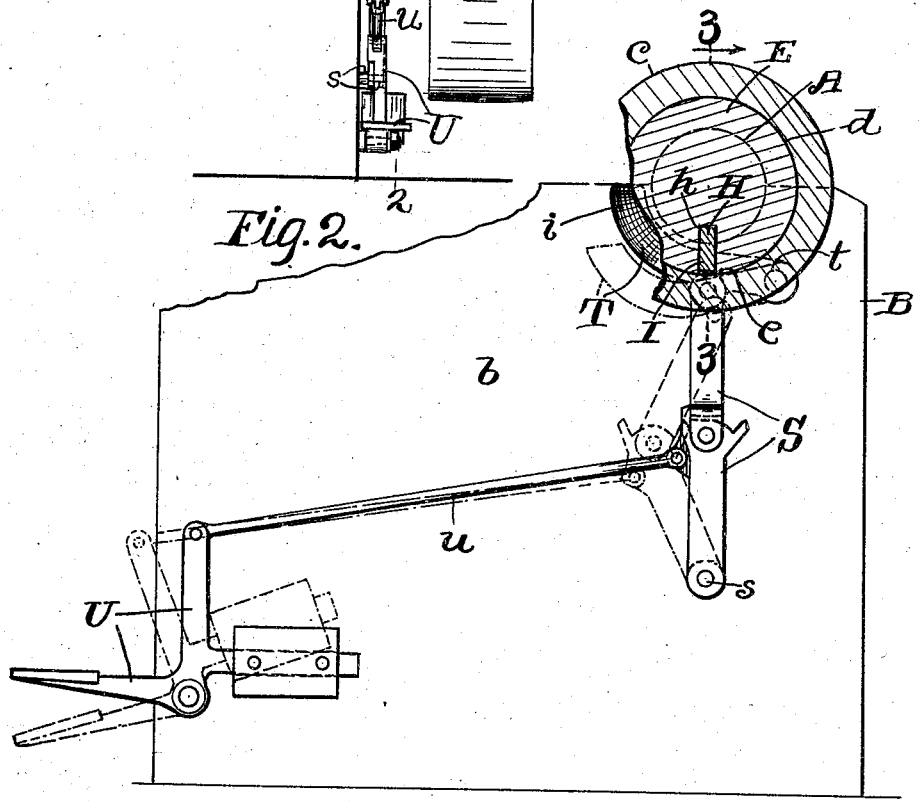
WITNESSES:
Daniel E. Daly.
G. W. Hayes.
INVENTOR
George W. Greenwood
BY
Lynch & Dyrer
his ATTORNEYS

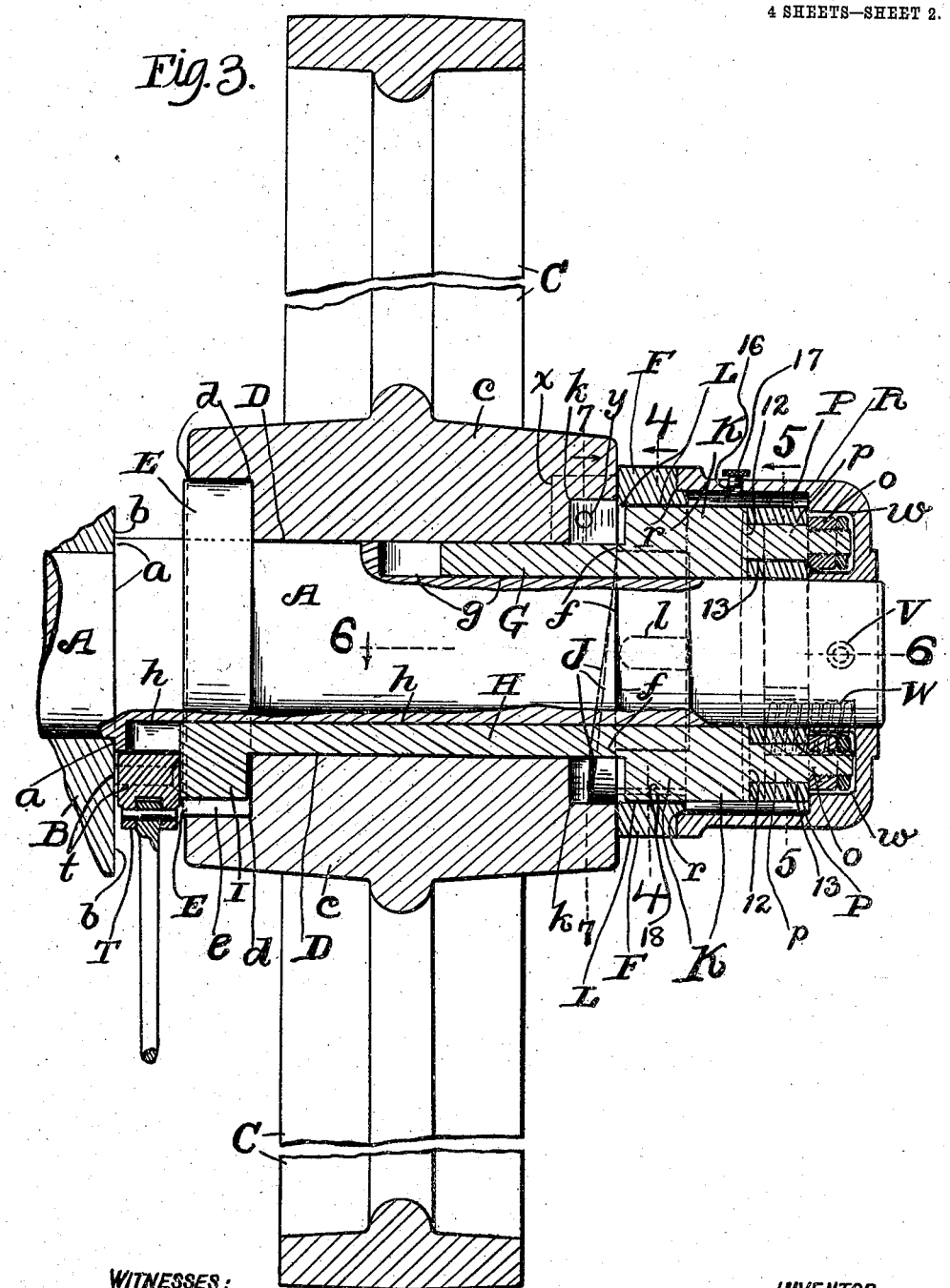

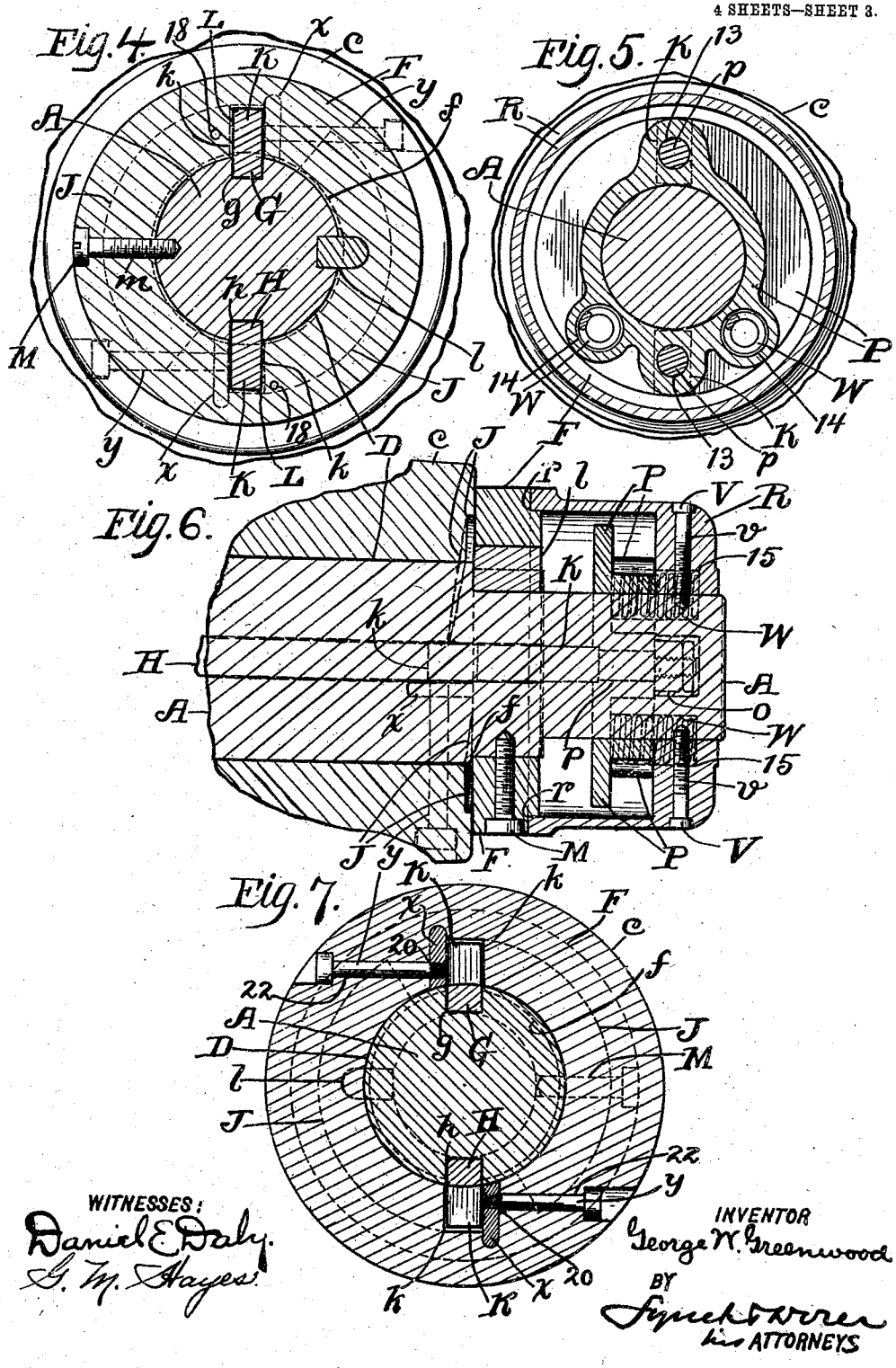

No. 815,010.  
PATENTED MAR. 13, 1906.  
G. W. GREENWOOD.  
CLUTCH.  
APPLICATION FILED MAY 27, 1903.  
4 SHEETS—SHEET 4.
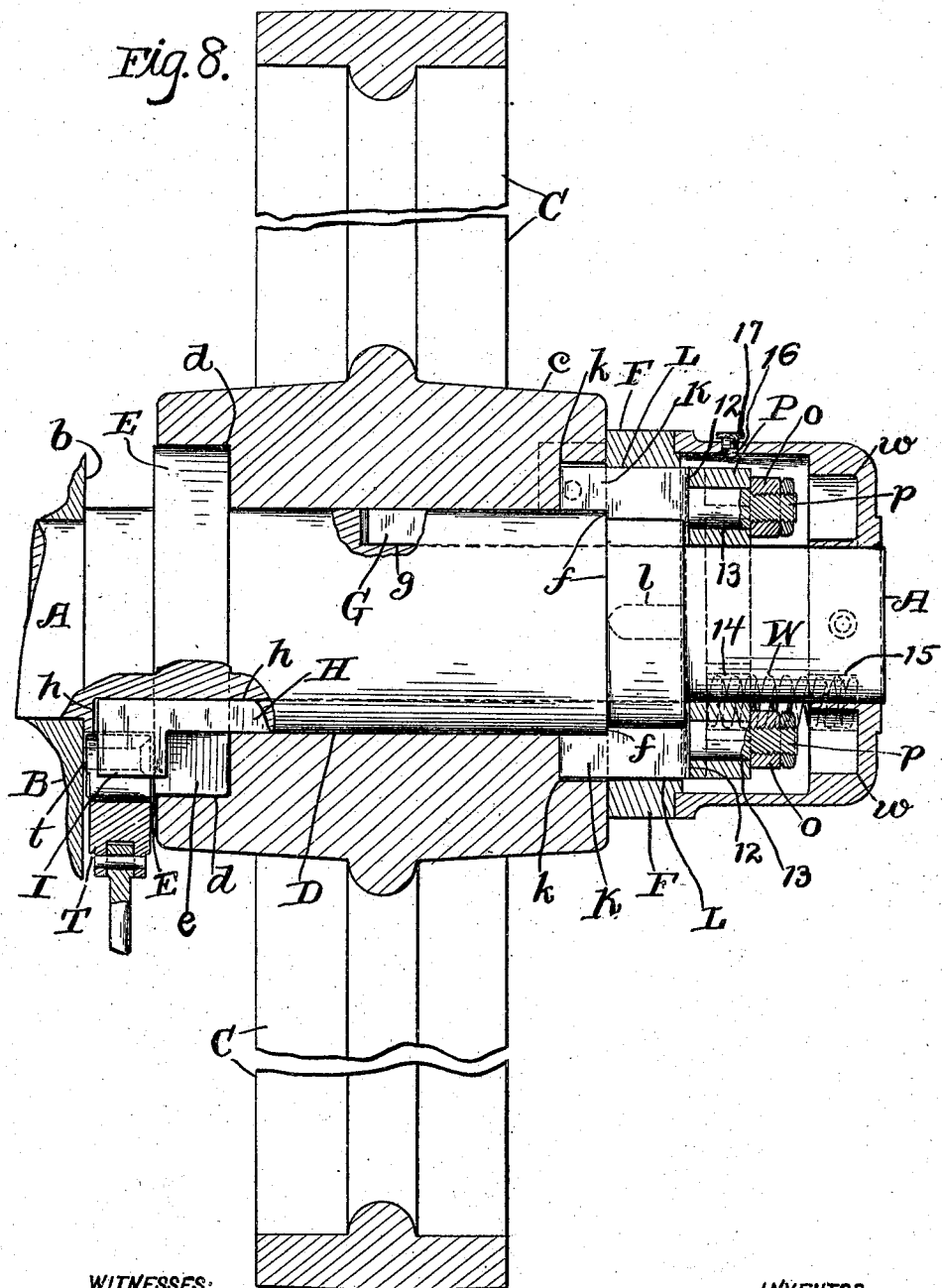

UNITED STATES PATENT OFFICE.

GEORGE W. GREENWOOD, OF CLEVELAND, OHIO.

CLUTCH.

No. 815,010.  Specification of Letters Patent.  Patented March 13, 1906.

Application filed May 27, 1903. Serial No. 158,934.

*To all whom it may concern:*

Be it known that I, GEORGE W. GREENWOOD, a citizen of the United States of America, residing at Cleveland, in the county of Cuyahoga and State of Ohio, have invented certain new and useful Improvements in Clutches; and I hereby declare the following to be a full, clear, and exact description of the invention, such as will enable others skilled in the art to which it pertains to make and use the same.

This invention relates to improvements in clutches for controlling the operative connection between a driving-wheel or rotary member and the shaft upon which the said rotary member is loosely mounted.

One object of this invention is to provide an improved clutch especially well adapted for use in establishing and interrupting operative connection between a wheel or rotary member and a shaft at short intervals of time.

Another object is to provide a clutch which is simple and durable in construction and efficient and reliable and comparatively noiseless in its operation.

Another object of this invention is to provide a clutch which is self-lubricating and participates in the lubrication of the opposing surfaces of the shaft and the interior of the hub of the wheel or rotary member from which power is to be transmitted to the shaft.

With these objects in view and to the end of realizing other advantages hereinafter appearing this invention consists in certain features of construction and combinations of parts hereinafter described, and pointed out in the claims.

In the accompanying drawings, Figure 1 is a side elevation illustrating an end portion of a shaft, a driving-wheel loosely mounted upon the shaft, and my improved clutch employed in controlling operative connection between the said wheel and the shaft. Fig. 2 is an elevation, largely in section, on line 2 2, Fig. 1, looking in the direction indicated by the arrow. Fig. 2 is drawn on a larger scale than Fig. 1. Fig. 3 is a side elevation, largely in section, on line 3 3, Fig. 2, looking in the direction indicated by the arrow and illustrating the aforesaid end portion of the shaft, the wheel mounted on the shaft, and the clutch instrumental in controlling operative connection between the said wheel and the shaft. Portions are broken away in Fig. 3 to reduce the size of the drawing and to more clearly show the construction. Fig. 4 is a transverse vertical section on line 4 4, Fig. 3, looking in the direction indicated by the arrow. Fig. 5 is a transverse vertical section on line 5 5, Fig. 3, looking in the direction indicated by the arrow. Fig. 6 is a horizontal secton on line 6 6, Fig. 3, looking in the direction indicated by the arrow. Fig. 7 is a transverse vertical section on line 7 7, Fig. 3, looking in the direction indicated by the arrow. Fig. 8 is a side elevation, largely in section, largely corresponding so far as concerns the subject-matter thereby illustrated with Fig. 3, except that in Fig. 8 the key-forming endwise-shiftable bars G and H of the clutch are shown in their operative position, whereas in Fig. 3 the said bars are shown in their inoperative position.

Referring to the drawings, A designates a horizontally-arranged shaft which has bearing in a standard B and extends a suitable distance beyond the outer side $b$ of the said standard, as shown in Figs. 1 and 3.

A driving-wheel C, to which power is to be transmitted in any approved manner, is loosely mounted on the shaft A a short distance from the said side $b$ of the standard B, having its hub $c$ loosely embracing the shaft A, which extends through the bore D in the hub. The hub $c$ is provided interiorly and in its end face which is opposite and adjacent to the standard B with an annular recess $d$, which form an annular enlargement of the bore D, as shown in Fig. 3, and is arranged to accommodate the location of a collar E, formed upon and integral with the shaft A and arranged within the inner end of the hub $c$. The collar E therefore prevents displacement of the wheel C endwise of the shaft A in the direction of the said collar or toward the standard B, and a collar F, mounted on and fixed to the shaft at the opposite end of the said hub, prevents displacement of the wheel C endwise of the shaft in the opposite direction or away from the collar E.

Two parallel grooves or ways $g$ and $h$ are formed in the periphery of the shaft A. The ways $g$ and $h$ extend longitudinally of the shaft. The ways $g$ and $h$ are parallel with the axial line of the shaft and are arranged diametrically opposite. Two endwise-shiftable bars G and H are arranged within and extend longitudinally of the ways $g$ and $h$, respectively. The hub $c$ is provided in one end face thereof with the annular bore enlargement $d$, as already indicated, and is provided in its opposite end face, as shown in Figs. 3, 7, and 8, with two recesses $k$, which are arranged diametrically opposite and connect and communicate with the bore D. The recesses $k$ are open at their outer ends. Guideways J are formed in the last-mentioned face of the hub and arranged concentrically of the shaft. The guideways J communicate at one end with the different recesses $k$, respectively, at one side of the respective recess and are deepest where they open into the respective recess and gradually reduced in depth toward their opposite end, as shown in Figs. 3 and 6. Both guideways J extend from the connected recesses $k$ in the direction in which the shaft A is rotated, and consequently in the same direction circumferentially of the shaft, and are uniform in width from end to end, as shown in Figs. 4 and 7. The bars G and H are provided with key-forming heads or members K, having the dimensions and arrangement required to render them capable of entering the recesses $k$ during the rotation of the wheel C and of being guided into the said recesses by the guideways J.

The shaft A is somewhat reduced diametrically at the guideway-containing end of the hub $c$ to form an annular shoulder $f$ on the said shaft, and the collar F abuts at its inner end against the said shoulder.

The collar F, as shown in Figs. 3 and 6, is provided interiorly with two slots L, which extend endwise through the collar and are arranged diametrically opposite. The slots L form slideways for the heads K of the bars G and H and are therefore arranged diametrically opposite. The heads K are long enough to engage the slideways L in both positions of the said bars. The bars G and H are in their operative position when they have been actuated in the direction and to the extent required to bring their heads K into engagement with the recesses $k$, as shown in Fig. 8, in which position the said heads K establish operative connection between the wheel C and the shaft A. The bars G and H are in their inoperative position when they have been actuated in the direction and to the extent required to entirely disengage their heads K from the recesses $k$, as shown in Fig. 3.

The collar F is preferably operatively connected with the shaft A by the well-known means of groove and feather, as at $l$, as shown in Figs. 4 and 6, and preferably said collar is also fixed to the shaft by a set-screw M, which extends into engagement with the shaft through a correspondingly-screw-threaded hole $m$, with which the said collar is provided.

By the construction hereinbefore described it will be observed that the collar F affords adequate lateral bearing to the heads K and that the said collar embraces said heads so as to prevent displacement of the heads outwardly from the shaft.

The heads K, as shown in Figs. 3 and 8, extend through the collar F and a suitable distance beyond the outer end of the said collar. Each head K is provided at its outer end with a stud $p$, which projects longitudinally and outwardly from and is arranged centrally of the outer end of the said head. The studs $p$ of the heads K of the bars G and H are parallel and arranged at diametrically opposite sides, respectively, of the shaft A.

A sleeve P is loosely mounted on the shaft A at the outer end of the heads K. The studs $p$ extend through holes 13, formed in the sleeve P. It will be observed, therefore, that the sleeve P embraces the inner end portions of the studs $p$. The sleeve P abuts against the outer end faces 12 of the heads K at the inner extremities of the studs $p$, which extend a suitable distance beyond the outer end of the said sleeve, and the outer end portions of the studs $p$ are screw-threaded, and correspondingly-threaded nuts $o$ are mounted upon the said outer end portions of the studs and arranged to hold the sleeve P against the aforesaid outer end faces of the heads K. It will be observed, therefore, that the sleeve P is operatively connected with the bars G and H at the heads K of the said bars, and obviously both bars G and H are actuated endwise simultaneously during the actuation of the said sleeve endwise of the shaft.

The way $h$ extends longitudinally of the shaft A beyond opposite ends of the hub $c$, and the bar H extends into and through a slot $e$, which is formed in and extends endwise through the collar E to accommodate the location and operation of the said bar. The ways $g$ and $h$ are of course long enough to accommodate the location and operation of the bars G and H, and the said bars extend in their operative position approximately from end to end of the said ways, as shown in Fig. 8.

The bar H terminates within the slot $e$ in a head I, which in the operative position of the said bar H, as shown in Fig. 8, is arranged in the main outside of the collar E.

The means employed for actuating the bars G and H from their operative position (shown in Fig. 8) to their inoperative position (shown in Fig. 3) comprises, preferably, a rock-arm T, which, as shown in Figs. 1 and 2, is arranged to operate between the hub $c$ and the standard B. The arm T is pivoted, as at $t$, to the standard B horizontally and longitudinally of and in suitable proximity to the shaft A. The arm T is therefore capable of being swung in a vertical plane. The arm T is provided at its free end with an incline $i$, which is arranged to face the outer end of the head of the bar H and slopes away from the said end of the said head in the direction of the standard B, as shown in Fig. 1.

The arrangement of the parts is such that the rock-arm T in its outwardly-swung or inoperative position is arranged outside of the path of the head I, as shown in dotted lines, Fig. 2, and in solid lines, Fig. 8; that the said head is arranged in the main within the slot e of the collar E when the bars G and H are in their inoperative position, (shown in Fig. 3;) that the rock-arm T is in its inwardly-swung or operative position, as shown in Figs. 1, 2, and 3, when the bars G and H are in their inoperative position; that during the rotation of the shaft A with the wheel C when the bars G and H are in their operative position the incline i of the rock-arm T upon actuating the said arm into its inner or operative position engages with the outer end of the head I and actuates the bar H, and consequently also the bar G, into their inoperative position, and thereby interrupts operative connection between the shaft A and the wheel C.

The mechanism employed for operating the arm T comprises, preferably, a toggle-joint S, which, as shown in Figs. 1 and 2, is arranged uprightly below the said arm. The upper link of the toggle-joint is operatively attached to the arm T between the axis and the incline of the said arm, and the lower link of the said joint is pivoted, as at s, to the standard B. The toggle-joint S is operatively connected at or near its knuckle by a rod u with a bell-crank U, which is supported from the standard B.

The collar F is provided in its outer end and externally with an annular recess r, which is snugly engaged by the inner end of a shell or casing R, which surrounds the sleeve P and incloses the outer ends of the heads K, the nuts o and the hereinafter-described means acting to retain the bars G and H in their operative position.

The casing or shell R snugly embraces the shaft A at the outer end of the sleeve P and, as shown in Figs. 3 and 6, is fixed to the shaft by set-screws V, which extend into engagement with the shaft through correspondingly-screw-threaded holes v, formed in the said shell or casing.

The casing or shell R is recessed, as at w, to accommodate the location of the outer end portions of the studs p and the nuts o on the said studs in the inoperative position of the bars G and H.

The means employed for shifting the bars G and H from their inoperative into their operative position is preferably the means acting to retain the said bars in their operative position and comprises, preferably, spiral springs W, interposed between opposing surfaces of the sleeve P and the shell or casing R and applied as required to exert pressure inwardly against the outer end of the said sleeve. Preferably the springs W extend from within recesses 14, formed in the outer ends of the sleeve P, into recesses 15, formed in the shell or casing R. The springs W are under tension when the bars G and H are in their inoperative position, as shown in Fig. 3, and obviously when the rock-arm T is actuated from its operative position (shown in Fig. 3) into its inoperative position (shown in Fig. 8) to release the bar H operate to actuate the bars G and H into their operative position. (Shown in Fig. 8.)

By the construction hereinbefore described it will be observed that the collar F and the shell or casing R form a dust-guard which excludes dust and dirt from the key-forming heads K of the bars G and H. It will be observed also that the shell or casing R forms a reservoir for the reception of a lubricating liquid and is provided at any suitable point with a screw-threaded charging-aperture 16, which is closed by a correspondingly-screw-threaded removable plug 17. It is obvious that any lubricating liquid contained within the said reservoir will creep or find ingress along the heads K into the recesses k and into the guideways J and into the inner end of the way g when the bars G and H are in their inoperative position. The bar G is shorter than the bar H and terminates at its inner end about centrally between the ends of the hub c, and the inner end portion of the way is arranged centrally between the ends of the said hub and in the inoperative position of the bar G forms a pocket for the reception of lubricant, and obviously the actuation of the bars G and H from their inoperative into their operative position when the recesses k, guideways J, and aforesaid pocket are supplied with lubricating liquid forces lubricating liquid from the said recesses, guideways, and pocket along and over the bearing forming opposing surfaces of the said hub and the shaft C.

To facilitate the passage of any lubricating liquid from within the reservoir formed by the shell or casing R to the recesses k and guideways J, the collar F is provided, preferably in close proximity to the heads K of the bars G and H, with ports or passage-ways 18, which extend endwise through the said collar and are arranged to feed lubricating liquid to the said guideways, and consequently to the said recesses.

It will be observed that the wheel C is during its operation rotated in the direction in which the guideways J increase in depth, and that the key-forming heads K of the bars G and H in actuating the said bars from their inoperative into their operative position will directly enter the recesses k or enter the said recesses through the guideways J, according as the said recesses or the said guideways are at the time of rendering the said bars operative directly opposite the aforesaid heads.

The guideway facing side wall of each recess k—that is, that side wall of the said recess which faces the adjacent end of the connected guideway J—is formed by a wear-plate *x*, as shown more clearly in Fig. 7, which plate is secured in place by a screw *y*, whose shank extends into engagement with a correspondingly-threaded hole 20, formed in the said plate, through a hole 22, formed in the hub *c*, and has its head abutting the inner end wall of the enlargement of the outer end of the said hole 22.

I would also remark that the oil within the recesses *k* and guideways J cushions the heads K of the bars G and H in the actuation of the said bars from their inoperative position into their operative position, and consequently objectionable noise in the said actuation of the said bars is avoided.

What I claim is—

1. The combination, with a shaft provided, in its periphery, with a groove or way extending longitudinally of and parallel with the axial line of the shaft, and a wheel or rotary member having a hub loosely mounted on the shaft and provided in one end face of the hub, with a recess which connects and communicates with the bore in the hub and is open at its outer end, and a guideway formed in the said face and extending circumferentially of the shaft and opening at one end thereof into the said recess at one side of the recess and gradually reduced in depth toward the opposite end of the recess, which hub is provided, in its opposite end face and interiorly, with an annular recess which forms an annular enlargement of the aforesaid bore, of an endwise-shiftable bar engaging and extending longitudinally of the peripheral way in the hub and extending from end to end of the bore in the hub, which bar, at one end, has a key-forming head arranged to engage the aforesaid recess and is provided, at its opposite end, with a head arranged to engage the aforesaid annular bore enlargement; means for exerting pressure against the outer end of the last-mentioned head to actuate the bar endwise in one direction, and means for actuating the bar endwise in the opposite direction, and the aforesaid way in the shaft being long enough to accommodate the location and operation of the said bar, and the arrangement of the parts being such that the key-forming head of the bar shall engage the aforesaid recess, or the other head of the bar shall engage the aforesaid bore enlargement, according as the bar is in the one or the other of its positions.

2. The combination, with a shaft provided, in its periphery, with a groove or way extending longitudinally of and parallel with the axial line of the shaft, and a wheel or rotary member having a hub loosely mounted on the shaft and provided, interiorly and at one end face of the hub, with a recess which connects with the bore in the hub and is open at the said face, which hub is provided, in its opposite end face and interiorly, with an annular recess which forms an annular enlargement of the aforesaid bore, of an endwise-shiftable bar engaging and extending longitudinally of the peripheral way in the hub and extending from end to end of the bore in the hub, which bar, at one end, has a key-forming head arranged to engage the aforesaid recess and is provided, at its opposite end, with a head arranged to engage the aforesaid annular bore enlargement; means for exerting pressure against the outer end of the last-mentioned head to actuate the bar endwise in one direction; and means for actuating the bar in the opposite direction, and the aforesaid way in the shaft being long enough to accommodate the location and operation of the said bar, and the arrangement of the parts being such that the key-forming head of the bar shall engage the aforesaid recess, or the other head of the bar shall engage the aforesaid bore enlargement, according as the bar is in the one or the other of its positions.

3. The combination, with a shaft provided, in its periphery, with a groove or way extending longitudinally of and parallel with the axial line of the shaft, and a wheel or rotary member having a hub loosely mounted on the shaft and provided, in one end face of the hub, with a recess which connects and communicates with the bore in the hub and is open at its outer end, which hub is provided, in its opposite end face and interiorly, with an annular recess which forms an annular enlargement of the aforesaid bore, of an endwise-shiftable bar engaging and extending longitudinally of the peripheral way in the hub, which bar at one end, has a key-forming head arranged to engage the aforesaid recess and is provided, at its opposite end, with a head arranged to engage the aforesaid annular bore enlargement; means for exerting pressure against the outer end of the last-mentioned head to actuate the bar in the direction required to render the key-forming head of the bar inoperative; means acting to shift the said bar endwise in the direction required to establish engagement between the key-forming head and the aforesaid recess and thereby render the said key-forming head operative, and the aforesaid way in the shaft being long enough to accommodate the location and operation of the said bar, and the arrangement of the parts being such that the key-forming head of the bar shall engage the aforesaid recess, or the other head of the said bar shall engage the aforesaid bore enlargement, according as the bar is in the one or the other of its positions.

4. The combination, with a shaft provided, in its periphery, with a groove or way extending longitudinally of and parallel with the axial line of the shaft, and a wheel or rotary member having a hub loosely mounted on the shaft and provided, in one end face of the hub, with a recess which connects and communicates with the bore in the hub and is open at its outer end, which hub is provided, in its opposite end face and interiorly, with an annular recess which forms an annular enlargement of the aforesaid bore, of an endwise-shiftable bar engaging and extending longitudinally of the peripheral way in the hub and terminating, at one end, in a key-forming member arranged to engage the aforesaid recess, which bar is provided, at its opposite end, with a head arranged to engage the aforesaid annular bore enlargement; means for operatively engaging the said head and thereby actuating the bar endwise in the direction required to render the key-forming member of the bar inoperative; means for actuating the said bar endwise in the direction required to establish engagement between the key-forming member and the aforesaid recess and thereby render the said key-forming member operative, and the aforesaid way in the shaft being long enough to accommodate the location and operation of the said bar, and the arrangement of the parts being such that the key-forming member shall engage the aforesaid recess, or the aforesaid head shall engage the aforesaid bore enlargement, according as the bar is in the one or the other of its positions.

5. The combination, with a shaft provided, in its periphery, with a groove or way extending longitudinally of the shaft, and a wheel or rotary member having a hub loosely mounted on the shaft and provided, in one end face thereof, with a recess which connects and communicates with the bore in the hub and is open at its outer end, and the shaft extending outwardly beyond the said face of the hub, of an endwise-shiftable bar engaging and extending longitudinally of the peripheral way in the hub and provided with a key-forming head or member which is arranged to engage the aforesaid recess and extends outwardly beyond the aforesaid face of the hub, which bar is in its operative position when the said key-forming member engages the said recess; means acting to retain the said bar in its operative position, a dust-guard-forming shell surrounding the shaft next adjacent the aforesaid face of the hub and comprising a collar operatively mounted upon the shaft and abutting against the aforesaid shoulder, which collar is provided with a slideway for the aforesaid key-forming member.

6. The combination, with a shaft provided, in its periphery, with a groove or way extending longitudinally of the shaft, and a wheel or rotary member having a hub loosely mounted on the shaft and provided, in one end face of the hub, with a recess which connects and communicates with the bore in the hub and is open at its outer end, and the shaft extending outwardly beyond the said face of the hub, of an endwise-shiftable bar engaging and extending longitudinally of the peripheral way in the hub and provided with a key-forming member which is arranged to engage the aforesaid recess during the rotation of the aforesaid loosely-mounted rotary member and extends outwardly beyond the aforesaid face of the hub, which bar is in its operative position when the said key-forming member engages the said recess; means for operating the said bar; a reservoir-forming shell surrounding the shaft adjacent the aforesaid face of the hub and comprising a collar fixed upon the shaft at the inner end of the reservoir, which collar is provided with a port or passage-way establishing communication between the interior chamber of the said shell and the aforesaid recess.

7. The combination, with a shaft provided, in its periphery, with a groove or way extending longitudinally of the shaft, and a wheel or rotary member having a hub loosely mounted on the shaft and provided, in one end face of the hub, with a recess which connects and communicates with the bore in the hub and is open at its outer end, and the shaft extending outwardly beyond the said face of the hub and reduced diametrically, at the said face, to form an annular shoulder upon the shaft, of an endwise-shiftable bar engaging and extending longitudinally of the peripheral way in the hub and provided with a key-forming head or member which is arranged to engage the aforesaid recess during the rotation of the aforesaid loosely-mounted rotary member and extends outwardly beyond the aforesaid face of the hub, which bar is in its operative position when the said key-forming member engages the said recess; means for operating the said bar; a reservoir-forming shell surrounding the shaft next adjacent the aforesaid face of the hub and comprising a collar fixed upon the shaft and abutting against the aforesaid shoulder, which collar is provided with a port or passage-way establishing communication between the interior chamber of the said shell and the aforesaid recess.

8. The combination, with a shaft provided, in its periphery, with a groove or way extending longitudinally of the shaft, and a wheel or rotary member having a hub loosely mounted on the shaft and provided, in one end face thereof, with a recess which connects and communicates with the bore in the hub and is open at its outer end, which hub is provided, in its opposite end face and interiorly, with an annular enlargement of the aforesaid bore, of an endwise-shiftable bar engaging and extending longitudinally of the peripheral way in the hub and extending from end to end of the bore in the hub, which bar has, at one end, a key-forming member adapted to engage with the aforesaid recess and is provided, at its opposite end, with a head arranged to engage the aforesaid annular bore enlargement; means acting to shift the said bar endwise in the direction required to establish engagement between, the key-forming member and the aforesaid recess, and means for engaging the aforesaid head and actuating the said bar endwise in the opposite direction.

9. The combination, with a shaft provided, in its periphery, with a groove or way extending longitudinally of the shaft, and a wheel or rotary member having a hub loosely mounted on the shaft and provided, in one end face thereof, with a recess which connects and communicates with the bore in the hub and is open at its outer end, which hub is provided, in its opposite end face and interiorly, with an annular enlargement of the aforesaid bore, of an endwise-shiftable bar engaging and extending longitudinally of the peripheral way in the hub and extending from end to end of the bore in the hub, which bar has, at one end, a key-forming member adapted to engage with the aforesaid recess and is provided, at its opposite end, with a head arranged to engage the aforesaid annular bore enlargement; means acting to shift the said bar endwise in the direction required to establish engagement between the key-forming member and the aforesaid recess, and a movable incline for exerting pressure against the outer end of the aforesaid head.

10. The combination, with a shaft provided, in its periphery, with a groove or way extending longitudinally of the shaft, and a wheel or rotary member having a hub loosely mounted on the shaft and provided, in one end face thereof, with a recess which connects and communicates with the bore in the hub and is open at its outer end, which hub is provided, in its opposite end face and interiorly, with an annular enlargement of the aforesaid bore, of an endwise-shiftable bar engaging and extending longitudinally of the peripheral way in the hub, which bar has, at one end, a key-forming member adapted to engage with the aforesaid recess and is provided, at its opposite end, with a head arranged to engage the aforesaid annular bore enlargement; means acting to shift the said bar endwise in the direction required to establish engagement between the key-forming member and the aforesaid recess; a pivotally-supported arm having an incline exerting pressure against or being out of engagement with the outer end of the aforesaid head according as the arm is in the one or the other of its two positions, and mechanism for actuating the said arm.

11. The combination, with a shaft provided in its periphery with grooves or waves extending longitudinally of the shaft, and a wheel or rotary member having a hub loosely mounted on the shaft and provided, in one end face thereof, with recesses connecting and communicating with the bore in the hub and open at their outer ends, which recesses are arranged to render them capable of simultaneously registering with the different aforesaid ways respectively, and the shaft extending outwardly beyond the aforesaid face of the hub and reduced diametrically at the said face to form an annular shoulder upon the shaft, of endwise-shiftable bars engaging and extending longitudinally of the peripheral ways in the hub and provided with key-forming heads or members arranged to engage with the aforesaid recesses and extending outwardly beyond the aforesaid face of the hub, which bars are in their operative position when their key-forming members engage the aforesaid recesses; means for shifting the said bars from their inoperative into their operative position; means for actuating the said bars from their operative position into their inoperative position, and a reservoir-forming casing surrounding the shaft next adjacent the aforesaid face of the hub and comprising a collar fixed upon the shaft and abutting against the aforesaid shoulder, which collar is provided with slide-ways engaged by the aforesaid key-forming members, and passage-ways arranged to feed oil from the interior chamber of the said casing to the aforesaid recesses.

12. The combination, with a shaft provided in its periphery with two grooves or ways extending longitudinally of the shaft and arranged diametrically opposite each other, and a wheel or rotary member having a hub loosely mounted on the shaft and provided, in one end face thereof, with two diametrically opposite recesses connecting and communicating with the bore in the hub and open at their outer ends, and one of the aforesaid ways extending beyond opposite ends of the hub, and the other of the said ways terminating at one end centrally between the ends of the hub, of two bars engaging and shiftable endwise of the different aforesaid ways respectively and provided each with a key-forming head or member for engaging with the one or the other of the aforesaid recesses, which bars are in their operative position when their key-forming members engage the aforesaid recesses; means for shifting the said bars simultaneously from their inoperative into their operative position; means for actuating the said bars simultaneously from their operative position into their inoperative position, and means for feeding lubricating liquid to the aforesaid recesses.

13. The combination, with a shaft provided in its periphery with grooves or ways extending longitudinally of the shaft, and a wheel or rotary member having a hub loosely mounted on the shaft and provided, in one end face thereof, with recesses connecting and communicating with the bore in the hub and open at their outer ends, which recesses are arranged to render them capable of registering with the different aforesaid ways respectively, and the shaft extending outwardly beyond the aforesaid face of the hub, of endwise-shiftable bars engaging and extending longitudinally of the aforesaid ways and provided with key-forming heads or members engaging or out of engagement with the aforesaid recesses according as the bars are in their operative or inoperative position and provided, at their outer ends, with studs projecting longitudinally and outwardly from the said key-forming members; a sleeve slidably mounted on the shaft and embracing the said studs; nuts on the studs at the outer end of the sleeve; a casing surrounding the sleeve and mounted on and fixed to the shaft at the outer end of the sleeve; means interposed between the outer end face of the sleeve and the opposing surface of the casing and acting to retain the aforesaid bars in their operative position; means for actuating the said bars from their operative into their inoperative position, and a collar operatively mounted on the shaft and interposed between the inner end of the said casing and the aforesaid hub, which collar has slideways engaged by the aforesaid key-forming members.

14. The combination, with a shaft provided in its periphery with grooves or ways extending longitudinally of the shaft, and a wheel or rotary member having a hub loosely mounted on the shaft and provided, in one end face thereof, with recesses connecting and communicating with the bore in the hub and open at their outer ends, which recesses are arranged to render them capable of registering with the different aforesaid ways respectively, and the shaft extending outwardly beyond the aforesaid face of the hub, of endwise-shiftable bars engaging and extending longitudinally of the aforesaid ways and provided with key-forming heads or members engaging or out of engagement with the aforesaid recesses according as the bars are in their operative or inoperative position, which key-forming members are provided, at their outer ends, with studs projecting longitudinally and outwardly from the said key-forming members; a sleeve slidably mounted on the shaft and embracing the said studs, which sleeve has recesses in its outer end face; nuts on the studs at the outer end of the sleeve; a casing surrounding the sleeve and mounted on and fixed to the shaft at the outer end of the sleeve and provided with recesses opposite the recesses in the sleeve; spiral springs extending from within the recesses in the sleeve into the recesses in the said casing and under tension in the inoperative position of the aforesaid bars, and means for actuating the said bars from their operative into their inoperative position.

15. The combination, with a shaft provided in its periphery with grooves or ways extending longitudinally of the shaft, and a wheel or rotary member having a hub loosely mounted on the shaft and provided, in one end face thereof, with recesses connecting and communicating with the bore in the hub and open at their outer ends, which recesses are arranged to render them capable of simultaneously registering with the different aforesaid ways respectively, and the shaft extending outwardly beyond the aforesaid face of the hub, of endwise-shiftable bars engaging and extending longitudinally of the aforesaid ways and provided with key-forming heads or members engaging or out of engagement with the aforesaid recesses according as the bars are in their operative or inoperative position; a sleeve slidably mounted on the shaft and operatively connected with the aforesaid bars; a casing surrounding the sleeve and mounted on and fixed to the shaft at the outer end of the sleeve; means interposed between the outer end face of the sleeve and the opposing surface of the said casing and acting to retain the sleeve in its inner position, and means for actuating the aforesaid bars from their operative into their inoperative position.

16. The combination, with a shaft provided in its periphery with grooves or ways extending longitudinally of the shaft, and a wheel or rotary member having a hub loosely mounted on the shaft and provided, in one end face thereof, with recesses connecting and communicating with the bore in the hub and open at their outer ends, which recesses are arranged to render them capable of simultaneously registering with the different aforesaid ways respectively, and the shaft extending outwardly beyond the aforesaid face of the hub, of endwise-shiftable bars engaging and extending longitudinally of the aforesaid ways and provided with key-forming heads engaging or out of engagement with the aforesaid recesses according as the bars are in their operative or inoperative position; a sleeve slidably mounted on the shaft and operatively connected with the said bars; a casing surrounding the sleeve and mounted on and fixed to the shaft at the outer end of the sleeve; means for actuating the sleeve endwise in the direction required to shift the aforesaid bars from their inoperative position into their operative position, and means for actuating the said bars from their operative into their inoperative position.

17. The combination, with a shaft provided in its periphery with a groove or way extending longitudinally of the shaft, and a wheel or rotary member having a hub loosely mounted on the shaft and provided with a recess connecting and communicating with the bore in the hub, of an endwise-shiftable bar engaging and extending longitudinally of the aforesaid way and provided with a key-forming head engaging or out of engagement with the aforesaid recess according as the bar is in its operative or inoperative position; a member slidable longitudinally of the shaft and operatively connected with the said bar; a casing containing the said slidable member and surrounding and supported from the shaft; means for actuating the said slidable member endwise in the direction required to shift the aforesaid bar from its inoperative position into its operative position, and means for actuating the said bar from its operative into its inoperative position.

18. The combination, with a shaft provided in its periphery with a groove or way extending longitudinally of the shaft, and a wheel or rotary member having a hub loosely mounted on the shaft and provided with a recess connecting and communicating with the bore in the hub, of a bar engaging and shiftable endwise of the aforesaid way and provided with a key-forming head or member for engaging with the aforesaid recess, which bar is in its operative position when its key-forming member engages the aforesaid recess; means for shifting the said bar from its inoperative into its operative position; means for actuating the said bar from its operative into its inoperative position, and means for feeding lubricating liquid to the aforesaid recess.

19. The combination, with a shaft provided in its periphery with a groove or way extending longitudinally of the shaft, and a wheel or rotary member having a hub loosely mounted on the shaft and provided with a recess connecting and communicating with the bore in the hub, which recess is arranged to register with the aforesaid way, and the shaft extending outwardly beyond a face of the hub and reduced diametrically at the said face to form an annular shoulder upon the shaft, of an endwise-shiftable bar engaging and extending longitudinally of the peripheral way in the hub and provided with a key-forming head or member arranged to engage with the aforesaid recess and extending outwardly beyond the aforesaid face of the hub, which bar is in its operative position when the key-forming member of the bar engages the aforesaid recess; means for shifting the said bar from its inoperative into its operative position; means for actuating the said bar from its operative position into its inoperative position, and a reservoir-forming casing surrounding the shaft next adjacent the aforesaid face of the hub and comprising a collar on the shaft and arranged next the aforesaid shoulder, which collar is provided with a slideway engaged by the aforesaid key-forming member, and a port or passage-way arranged to feed oil from the interior chamber of the said casing to the aforesaid recess.

20. The combination, with a shaft provided, in its periphery, with a groove or way extending longitudinally of the shaft, and a wheel or rotary member having a hub loosely mounted on the shaft and provided with a recess which connects and communicates with the bore in the hub, of an endwise-shiftable bar engaging and extending longitudinally of the peripheral way in the hub, which bar has a key-forming member adapted to engage with the aforesaid recess and is also provided with a head; means acting to shift the said bar endwise in the direction required to establish engagement between the key-forming member and the aforesaid recess; a movable member having an incline exerting pressure against or being out of engagement with the outer end of the aforesaid head according as the said incline-forming member is in the one or the other of its two positions, and mechanism for actuating the said incline-forming member.

21. The combination, with a shaft provided, in its periphery, with a groove or way extending longitudinally of the shaft, and a wheel or rotary member having a hub loosely mounted on the shaft and provided with a recess which connects and communicates with the bore in the hub, of an endwise-shiftable bar engaging and extending longitudinally of the peripheral way in the hub and extending from end to end of the bore in the hub, which bar has a key-forming member adapted to engage with the aforesaid recess and is also provided with a head a suitable distance from the key-forming member; means acting to shift the said bar endwise in the direction required to establish engagement between the key-forming member and the aforesaid recess, and means for engaging the aforesaid head and actuating the said bar endwise in the opposite direction.

22. The combination, with a shaft provided, in its periphery, with a groove or way extending longitudinally of the shaft, and a wheel or rotary member having a hub loosely mounted on the shaft and provided with a recess which connects and communicates with the bore in the hub, and the shaft extending outwardly beyond a face of the hub, of an endwise-shiftable bar engaging and extending longitudinally of the peripheral way in the hub and provided with a key-forming member which is arranged to engage the aforesaid recess during the rotation of the aforesaid loosely-mounted rotary member and extends outwardly beyond the aforesaid face of the hub, which bar is in its operative position when the said key-forming member engages the said recess; means for operating the said bar; a reservoir-forming shell surrounding the shaft adjacent the aforesaid face of the hub and comprising a collar mounted on the shaft at the inner end of the reservoir, which collar is provided with a port or passage-way establishing communication between the interior chamber of the said shell and the aforesaid recess.

23. The combination, with a shaft provided in its periphery with a groove or way extending longitudinally of the shaft, and a wheel or rotary member having a hub loosely mounted on the shaft and provided with a recess which connects and communicates with the bore in the hub and the shaft extending outwardly beyond a face of the hub, of an endwise-shiftable bar engaging and extending longitudinally of the peripheral way in the hub and provided with a key-forming head or member which is arranged to engage the aforesaid recess and extends outwardly beyond the aforesaid face of the hub, which bar is in its operative position when the said key-forming member engages the said recess; means acting to retain the said bar in its operative position, a dust-guard-forming shell surrounding the shaft adjacent the aforesaid face of the hub and comprising a collar mounted on the shaft, which collar is provided with a slideway for the aforesaid key-forming member.

24. The combination, with a shaft provided, in its periphery, with a groove or way extending longitudinally of the shaft, and a wheel or rotary member having a hub loosely mounted on the shaft and provided with a recess which connects and communicates with the bore in the hub, of an endwise-shiftable bar engaging and extending longitudinally of the peripheral way in the hub and having a key-forming member arranged to engage the aforesaid recess; means for operatively engaging the said bar and thereby actuating the bar endwise in the direction required to render the key-forming member of the bar inoperative; means for actuating the said bar endwise in the direction required to establish engagement between the key-forming member and the aforesaid recess and thereby render the said key-forming member operative, and the aforesaid way in the shaft being long enough to accommodate the location and operation of the said bar.

In testimony whereof I sign the foregoing specification, in the presence of two witnesses, this 12th day of May, 1903, at Cleveland, Ohio.

GEORGE W. GREENWOOD.

Witnesses:
C. H. DORER,
TELSA SCHWARTZ.